(12) United States Patent
Chiang et al.

(10) Patent No.: US 11,337,064 B2
(45) Date of Patent: May 17, 2022

(54) SYSTEMS AND METHODS FOR ENHANCED AUTHENTICATION TECHNIQUES USING NETWORK-IMPLEMENTED LOCATION DETERMINATION

(71) Applicant: Verizon Patent and Licensing Inc., Basking Ridge, NJ (US)

(72) Inventors: David Chiang, Fremont, CA (US); Lalit R. Kotecha, San Ramon, CA (US); Jin Yang, Orinda, CA (US); Arda Aksu, Martinez, CA (US); Vishwanath Ramamurthi, San Ramon, CA (US); Donna L. Polehn, Mercer Island, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/986,857

(22) Filed: Aug. 6, 2020

(65) Prior Publication Data

US 2022/0046415 A1 Feb. 10, 2022

(51) Int. Cl.
*H04W 12/06* (2021.01)
*H04W 84/12* (2009.01)
(Continued)

(52) U.S. Cl.
CPC .......... *H04W 12/06* (2013.01); *H04W 4/029* (2018.02); *H04W 84/12* (2013.01); *H04W 88/06* (2013.01)

(58) Field of Classification Search
CPC ....... H04W 12/06; H04W 4/02; H04W 4/021; H04W 4/029; H04W 4/70; H04W 12/068; H04W 12/08; H04W 12/12; H04W 12/61; H04W 12/63; H04W 12/71; H04W 12/72; H04W 12/76; H04W 28/18; H04W 4/06; H04W 4/08; H04W 4/12; H04W 4/80; H04W 64/003; H04W 64/006; H04W 68/005; H04W 68/02; H04W 68/04; H04W 8/04; H04W 8/06; H04W 84/005; H04W 84/12; H04W 88/06; G06Q 20/3224;
(Continued)

(56) References Cited

U.S. PATENT DOCUMENTS

| 7,591,413 | B1 * | 9/2009 | Block | G07F 19/20 235/379 |
| 7,866,544 | B1 * | 1/2011 | Block | G06Q 20/3224 235/379 |

(Continued)

FOREIGN PATENT DOCUMENTS

CN 103077458 A * 5/2013

*Primary Examiner* — Matthew C Sams

(57) ABSTRACT

A system described herein may provide a technique for enhanced authentication techniques that leverage network-based location determination of UEs, such as mobile telephones or other devices that communicate with a wireless network. For example, a wireless network may monitor, determine, or otherwise maintain information regarding the geographic location of User Equipment ("UEs") that are associated with the wireless network. Some embodiments may utilize such network-monitored location information to verify that a participant device, associated with a given UE, is located within a particular proximity of the UE when performing an authentication process to receive services or resources.

20 Claims, 10 Drawing Sheets

(51) Int. Cl.
    *H04W 88/06* (2009.01)
    *H04W 4/029* (2018.01)
(58) Field of Classification Search
    CPC .. G06Q 20/1085; G06Q 20/322; G06Q 20/18;
        G06Q 20/3278; G06Q 20/40; G06Q
        20/32; G06Q 20/382; G06Q 20/425;
        G06Q 40/02; G06Q 20/108; G06Q 20/20;
        G06Q 20/3221; G06Q 20/3223; G06Q
        20/3227; G06Q 20/326; G06Q 20/3276;
        G06Q 20/3829; G06Q 20/388
    See application file for complete search history.

(56) References Cited

U.S. PATENT DOCUMENTS

| | | | | |
|---|---|---|---|---|
| 7,883,008 B1* | 2/2011 | Miller | ............... | G06Q 20/425 |
| | | | | 235/379 |
| 7,992,777 B1* | 8/2011 | Block | ............... | G07F 19/201 |
| | | | | 235/379 |
| 9,886,688 B2* | 2/2018 | Weiner | ............... | G06Q 20/3829 |
| 10,467,604 B1* | 11/2019 | Dorsch | ............... | G06Q 20/3223 |
| 11,188,904 B2* | 11/2021 | Arora | ............... | G06Q 20/40 |
| 2010/0082490 A1* | 4/2010 | Rosenblatt | ............... | G06Q 20/382 |
| | | | | 705/64 |
| 2013/0085941 A1* | 4/2013 | Rosenblatt | ............... | G06Q 20/1085 |
| | | | | 705/44 |
| 2013/0262311 A1* | 10/2013 | Buhrmann | ............... | G06Q 20/326 |
| | | | | 705/44 |
| 2014/0279113 A1* | 9/2014 | Balasubramanian | .. | G06Q 20/20 |
| | | | | 705/21 |
| 2014/0279490 A1* | 9/2014 | Calman | ............... | G06Q 20/40 |
| | | | | 705/43 |
| 2014/0351125 A1* | 11/2014 | Miller | ............... | G06Q 20/1085 |
| | | | | 705/43 |
| 2016/0007316 A1* | 1/2016 | Vaidya | ............... | H04W 64/003 |
| | | | | 370/312 |
| 2017/0195339 A1* | 7/2017 | Brown | ............... | G06F 21/34 |
| 2018/0263013 A1* | 9/2018 | Jain | ............... | H04W 4/02 |
| 2019/0239071 A1* | 8/2019 | Krishnan | ............... | H04W 12/76 |

* cited by examiner

SYSTEMS AND METHODS FOR ENHANCED AUTHENTICATION TECHNIQUES USING NETWORK-IMPLEMENTED LOCATION DETERMINATION

BACKGROUND

Wireless user equipment ("UE"), such as mobile telephones or other wireless communication devices, may communicate with a wireless network using radio frequency ("RF") communications according to one or more radio access technologies ("RATs"), such as Long-Term Evolution ("LTE"), Fifth Generation ("5G"), and/or other RATs. A wireless network may reliably and securely monitor a location of UEs in order to appropriately provide wireless service to such UEs, including determining a tracking area ("TA") in which a UE is located or other performing other granular location monitoring.

DETAILED DESCRIPTION OF THE PREFERRED EMBODIMENTS

The following detailed description refers to the accompanying drawings. The same reference numbers in different drawings may identify the same or similar elements.

Embodiments described herein provide for enhanced authentication techniques that leverage network-based location determination of UEs, such as mobile telephones or other devices that communicate with a wireless network. For example, a wireless network, such as a Long-Term Evolution ("LTE") network, a Fifth Generation ("5G") network, or other type of network, may monitor, determine, or otherwise maintain information regarding the geographic location of UEs that are connected to a RAN associated with the wireless network.

The geographic location of a given UE may be monitored, determined, maintained, etc. on the basis of a TA in which the UE is located, a particular cell or RAN to which the UE is located (e.g., where geographic locations of such RANs or cells are static or are otherwise able to be determined), latitude and longitude coordinates at which the UE is located, and/or the geographic location of the UE may be represented in some other suitable manner. The geographic location may, for example, be determined by one or more components of a RAN to which the UE is connected or is in range (e.g., using network triangulation techniques), may be determined by the UE (e.g., using Global Positioning System ("GPS") techniques or other suitable techniques), and/or may be determined in some other suitable manner.

Figure 1:
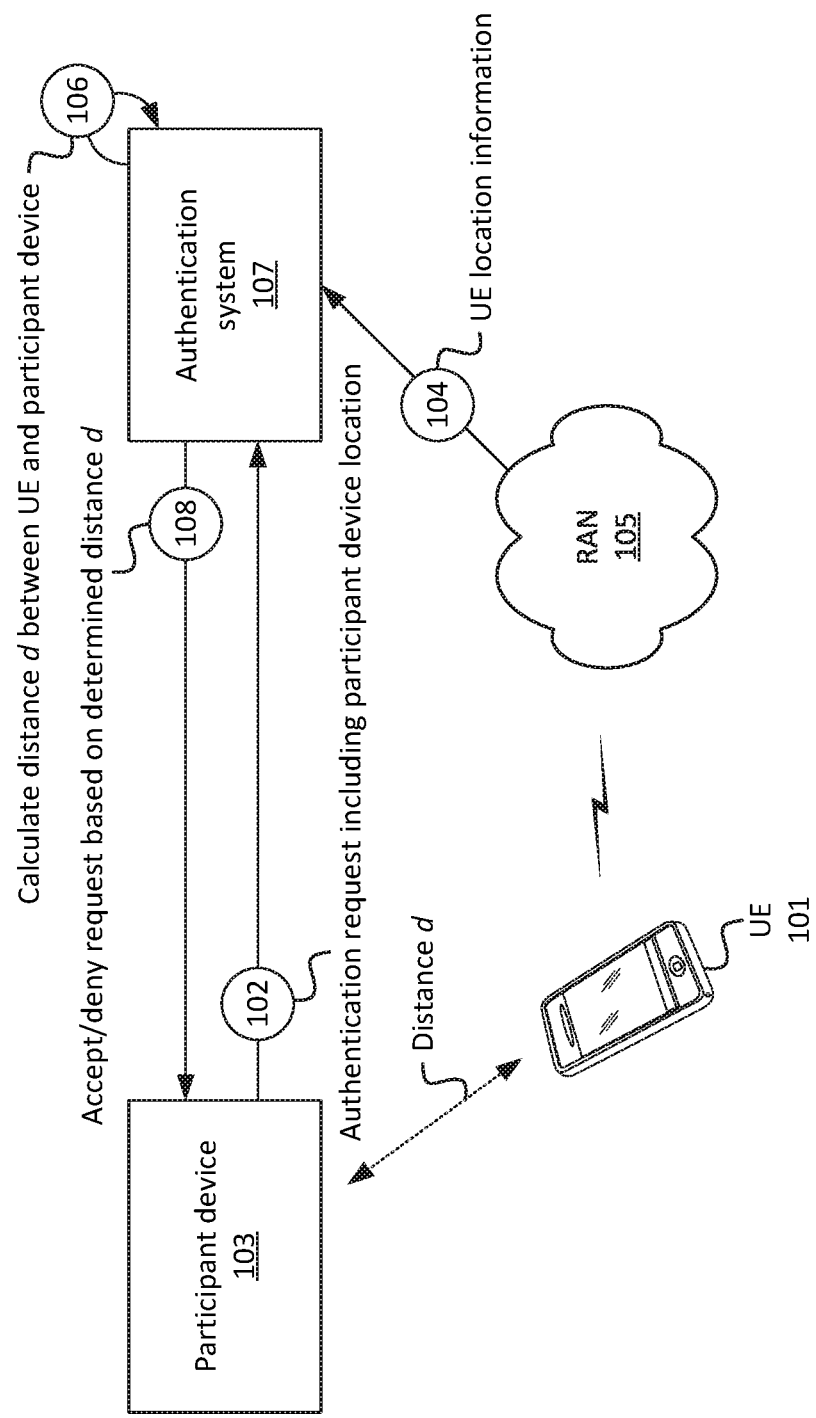
FIG. 1 illustrates an example overview of one or more embodiments described herein, in which a network-determined location of a UE may be used in an enhanced authentication procedure in accordance with some embodiments.

As shown in FIG. 1, embodiments described herein include an enhanced authentication system which communicates with a wireless network associated with a particular UE 101 (e.g., a RAN to which UE 101 is connected or of which UE 101 is in range), in order to receive geographic location information associated with UE 101 and to authenticate another device (referred to herein as a "participant device"). In some embodiments, for example, participant device 103 may be a desktop computer, laptop computer, tablet computer, and/or some other computing device that does not have the capability to connect to RAN 105 or another wireless network (e.g., does not have a wireless radio that operates at a RAT associated with RAN 105, or is otherwise incapable of connecting to RAN 105), or is otherwise not connected to RAN 105. Generally speaking, the enhanced authentication techniques described herein may be used to verify that a user who is submitting an authentication request via participant device 103 is in possession of UE 101, thus providing an additional layer of security over techniques that do not take the location of UE 101 into account.

In some scenarios, and as discussed herein, a user may be in possession of both UE 101 and participant device 103, but may wish to use participant device 103 instead of UE 101 for certain reasons or uses. For example, participant device 103 may be a computer with more powerful processing capabilities than UE 101, or participant device 103 may include or may be coupled to a display device that is larger or has greater resolution than a display screen integrated in UE 101. As another example, the user may prefer input devices associated with participant device 103 (e.g., mouse, keyboard, camera, etc.) over input devices or techniques associated with UE 101 (e.g., touchscreen, camera with lower resolution, etc.). For example, a user may wish to join a video conference using participant device 103 as opposed to UE 101, may wish to access a secure web-accessible resource (e.g., banking website, work-related website, etc.), or otherwise use participant device 103 instead of UE 101.

In accordance with some embodiments, participant device 103 may output (at 102) an authentication request to authentication system 107. For example, a video conferencing application, banking application, web browsing application, or the like may output the authentication request to authentication system 107. Participant device 103 may output the authentication request in response to, for example, a user initiating a video conferencing session, the user attempting to access a banking website, or at some other suitable time.

In some embodiments, participant device 103 (or an application executing at participant device 103) may implement an application programming interface ("API") to communicate with authentication system 107, may access a Uniform Resource Locator ("URL") that directs the authentication request to authentication system 107, and/or may otherwise communicate with authentication system 107. While shown in the figure as an arrow between participant device 103, the authentication request may traverse one or more networks (e.g., the Internet or some other network) or devices (e.g., a video conferencing application server, a web server, or some other device). That is, for instance, in some situations the authentication request may be received by a server or other type of device that is communication with participant device 103 and is forwarded by such server or other device to authentication system 107. For the sake of brevity, however, such authentication requests are described herein as being sent from participant device 103 to authentication system 107. Similarly, communications from authentication system 107 to participant device 103 may follow similar communication pathways, but are described herein as being sent from authentication system 107 to participant device 103.

In some embodiments, the authentication request (at 102) may include a user name and password, a Personal Identification Number ("PIN") code, and/or other type of authentication-related communication. In some embodiments, the authentication request may include a user name, account identifier, or other type of identifier that is also associated with UE 101. For example, authentication system 107 may receive or maintain information correlating UE 101 (e.g., based on an identifier of UE 101, such as an International Mobile Subscriber Identity ("IMSI") value, an International Mobile Station Equipment Identity ("IMEI") value, or some other suitable identifier) to a user name, account name, etc. Additionally, or alternatively, authentication system 107 may receive or maintain information correlating UE 101 to an identifier of participant device 103 (e.g., an Internet Protocol ("IP") address of participant device 103, a hardware identifier of participant device 103, or some other suitable identifier which may be included in the authentication request).

In some embodiments, the authentication request (at 102) may include location information for participant device 103. For example, participant device 103 may include location determination functionality, such as a GPS-based location determination function, a triangulation-based location determination function, or some other suitable location determination function. As another example, the location may be provided manually. For example, a user of participant device 103 may provide an address or other indicator of location in which participant device 103 is located at the time of the authentication request.

Authentication system 107 may also receive (at 104) information indicating a geographical location of UE 101. For example, authentication system 107 may receive such information from one or more components of RAN 105. In some embodiments, while not shown here, authentication system 107 may receive such information from one or more components of a core network that is communicatively coupled to RAN 105 (e.g., an Evolved Packet Core ("EPC") network, a 5G core ("5GC") network, or some other type of core network). For example, the core network may include a Service Capability Exposure Function ("SCEF"), a Network Exposure Function ("NEF"), or some other device, system, or network function that provides an API or other communication pathway by which authentication system 107 may obtain location information for one or more UEs, such as UE 101. For the sake of brevity, the location information is described herein as being provided by RAN 105.

In some embodiments, authentication system 107 may request the location information from RAN 105 (e.g., based on receiving (at 102) the authentication request from participant device 103, with which UE 101 is associated). In some embodiments, authentication system 107 may receive the location information from RAN 105 on an ongoing basis. For example, RAN 105 (or some other device or system, as noted above) may "push" the location information associated with UE 101 to authentication system 107 (e.g., without a specific request for such information from authentication system 107). In some embodiments, RAN 105 may provide the location information to authentication system 107 on a periodic or intermittent basis, and/or upon the occurrence of certain events (e.g., UE 101 powering on or connecting to RAN 105, UE 101 moving from one location to another, etc.).

Authentication system 107 may calculate (at 106) a distance (shown in the figure as distance d) between UE 101 and participant device 103. For example, authentication system 107 may calculate the distance d based on the location of participant device 103 (as received at 102) and the network-reported location of UE 101 (e.g., as received at 104). Generally speaking, for example, the presence of UE 101 and participant device 103 at the same location or within a threshold proximity (e.g., if distance d is within a threshold distance) may indicate that a user who is initiating the authentication request via participant device 103 (at 102) is in possession of UE 101, with which the same user is associated.

Authentication system 107 may accordingly accept or deny (at 108) the authentication request from participant device 103 based on the determined distance d between participant device 103 and UE 101. For example, if UE 101 and participant device 103 are within a threshold proximity (e.g., within 10 meters of each other, within 100 meters of each other, within 1 kilometer of each other, are located in the same city, or some other suitable proximity), then authentication system 107 may accept the authentication request. On the other hand, if UE 101 and participant device 103 are not within the threshold proximity, then authentication system 107 may deny the authentication request. Additionally, or alternatively, if UE 101 and participant device 103 are not within the threshold proximity (e.g., if distance d is greater than the threshold proximity), then authentication system 107 may output an alert to UE 101 (e.g., may send a Short Message Service ("SMS") message, Multimedia Messaging Service ("MIMS") message, or other suitable type of message using a Mobile Directory Number ("MDN") of UE 101 or some other suitable type of identifier or locator). Additionally, or alternatively, if UE 101 and participant device 103 are not within the threshold proximity, authentication system 107 may accept the authentication request with limited functionality. For example, authentication system 107 may indicate, to participant device 103 or an application server (or other device or system) with which the authentication request is associated, that UE 101 is not located within a threshold proximity of participant device 103. Participant device 103 and/or the application server may accordingly proceed with a requested service or resource, with less access rights than if UE 101 and participant device 103 were within the threshold proximity (e.g., some information may be withheld from participant device 103, which would otherwise be presented to participant device 103).

As another example, if the authentication request is associated with a video conferencing system (e.g., where participant device 103 executes a video conferencing application that is in communication with an application server that hosts video conferencing services), a host or other participants of a video conference in which participant device 103 participates may be notified that participant device 103 was authorized (e.g., by authentication system 107) to join the conference, but that a user participating via participant device 103 may potentially not be an expected user, based on the absence of UE 101. In some embodiments, the video conferencing system may allow video and/or voice to be sent from participant device 103, but may disallow video and/or voice to be provided to participant device 103, based on the determination that participant device 103 and UE 101 are not within the threshold proximity of each other.

In some embodiments, if participant device 103 and UE 101 are not within a threshold distance of each other, authentication system 107 may require additional authentication. For example, authentication system 107 may indicate to participant device 103 that such additional authentication is required, which may include requiring a biometric login procedure. For example, authentication system 107 may request that a user of participant device 103 provide an image or video of the user's face (e.g., via a camera device associated with participant device 103), and the image or video may be provided to authentication system 107. In some embodiments, for example, a user of UE 101 may have previously performed a registration process with authentication system 107 to enable biometric authentication (e.g., may provide an image or video of the face of the user of UE 101). In such embodiments, authentication system 107 may perform a comparison of the image or video of the user's face (from participant device 103) to the previously registered image or video of the user's face (e.g., as previously provided during the registration process with UE 101). In this manner, authentication system 107 may be able to verify the identity of the user in situations where UE 101 and participant device 103 are not located close to each other (e.g., within the threshold proximity). As with the above examples, the authentication using a biometric procedure as outlined above may, in some embodiments, result in a reduced level of access as compared to access that may be granted when UE 101 and participant device 103 are located together. In some embodiments, authentication system 107 may require all three forms of authentication (e.g., authentication information from participant device 103 such as user name and password, proximity of UE 101 to participant device 103, and biometric information received via participant device 103).

While examples of biometric information are discussed above in the context of facial recognition, in some embodiments, additional or different types of biometric information may be used. For example, in some embodiments, voice recognition, fingerprints, or other suitable biometric information may be used to practice similar concepts as discussed above. In some embodiments, as discussed below, authentication system 107 may use other types of authentication information to authenticate participant device 103 and/or to verify that UE 101 and participant device 103 are located within a threshold proximity.

In some embodiments, authentication system 107 may determine whether the received location information of UE 101 is anomalous, based on a location history or profile associated with UE 101, and may deny (at 108) authentication requests when the location information is anomalous. For example, authentication system 107 may receive (e.g., from a wireless network with which UE 101 is associated) location history information, indicating that UE 101 is or was located in a particular city prior to the request, and may determine that the location of UE 101, as indicated (at 104) is a different city. Specifically, for example, a previous report of the location of UE 101 may indicate that UE 101 was located at a particular location 5 minutes before the authentication request, and the UE location information (received at 104) may indicate that UE 101 is located 1,000 km away from the previously reported information. In such situations, it may be possible that the location of UE 101 (as reported at 104) may be inaccurate or has otherwise been compromised, as it is unlikely that UE 101 would have been able to travel 1,000 km in 5 minutes. In such situations, authentication system 107 may deny the request, even if other aspects of the authentication process are passed.

As another example, authentication system 107 may determine whether the location of UE 101 (as received at 104) does not match an expected location, which may be based on a profile associated with UE 101. Such profile may be based on a location history of UE 101, which may be generated over time. For example, the profile may indicate that UE 101 is typically located at a particular location from 7:00 PM through 9:00 AM (e.g., a home of the user of UE 101). If, instead, the reported (at 104) location of UE 101 indicates that UE 101 is located at a different location, and/or is at least a threshold distance away from the expected location, authentication system 107 may deny (at 108) the authentication request.

In some embodiments, authentication system 107 may determine whether the location of UE 101 matches an expected location, and/or is in a "safe" location (e.g., a home of a user of UE 101, a workplace of the user, or some other location associated with the user as determined based on historical location activity of UE 101). In such instances, authentication system 107 may indicate (e.g., to participant device 103 or some other device or system involved in the authentication process) that UE 101 is in a "safe" location. Participant device 103 and/or other device or system may use such an indication to confirm authentication of UE 101. In some embodiments, an authentication process in which such confirmation is received from authentication system 107 may require fewer user interactions or fewer forms of authentication than situations where such confirmation is not received from authentication system 107.

Figure 2:
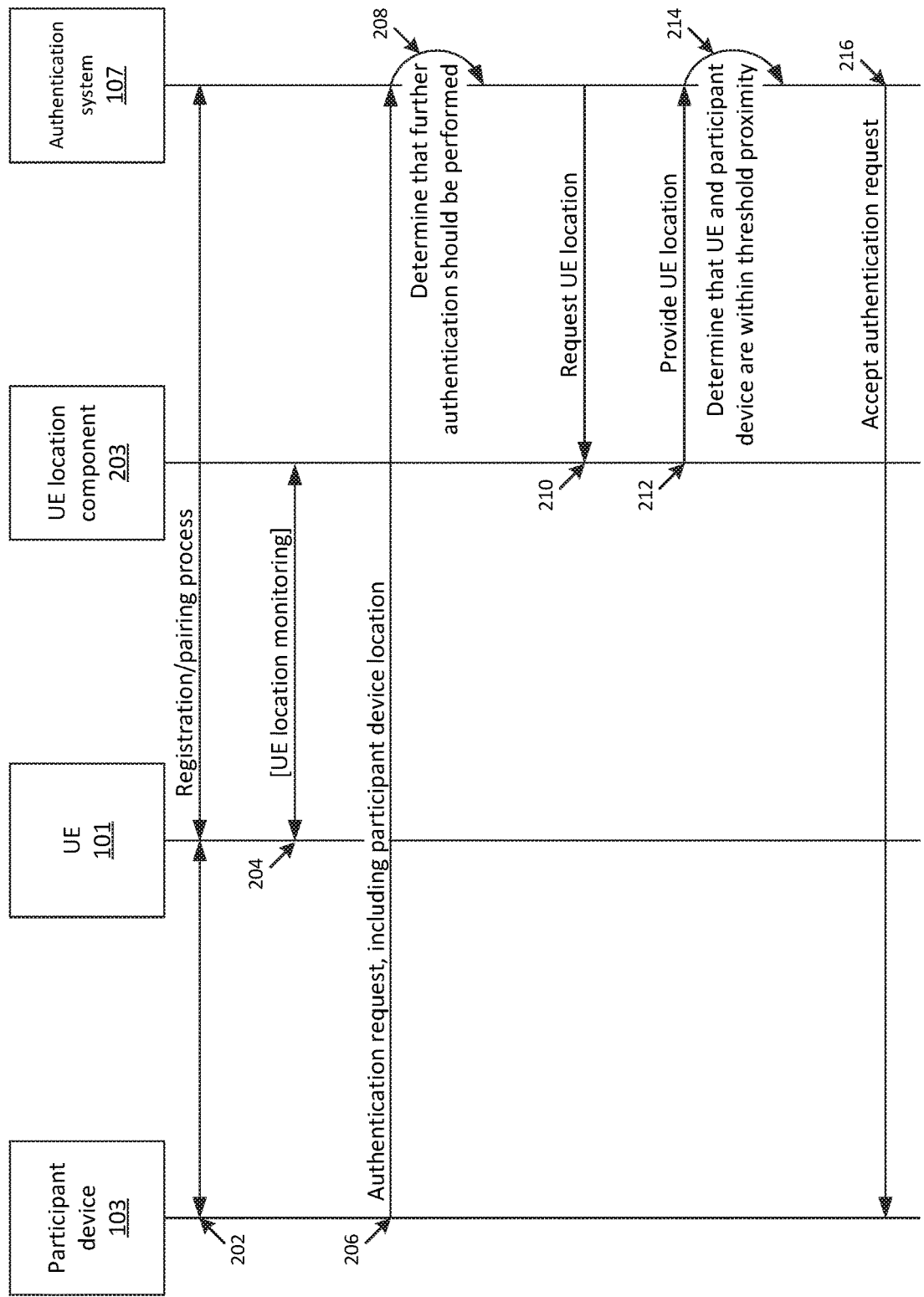
FIG. 2 illustrates an example signal flow for authenticating a participant device using a network-determined location of an associated UE, in accordance with some embodiments.

FIG. 2 illustrates an example signal flow for authenticating participant device 103 using a network-determined location of an associated UE 101, in accordance with some embodiments. For example, as shown, UE 101 and participant device 103 may perform or participate in (at 202) a registration and/or pairing process. For example, a user may register UE 101 and participant device 103 as being associated with the user, such as by providing an indication to authentication system 107 (e.g., via UE 101, participant device 103, or some other device or system) that UE 101 and participant device 103 are associated.

The registration process (at 202) may include providing a device identifier associated with UE 101, such as an IMSI value, an IMEI value, a MDN, an IP address, and/or some other identifier associated with UE 101. In some embodiments, UE 101 may implement an API or some other suitable communication technique by which UE 101 may communicate such information to authentication system 107 in order to register UE 101 with authentication system 107. In some embodiments, as discussed above, the registration process (at 202) may include providing biometric information from UE 101 to authentication system 107, which may include image or video data of a face of the user, image data of a fingerprint of the user, audio data of a voice of the user, or other information. In some embodiments, the biometric information may be encrypted, hashed, or otherwise altered, such that raw biometric information is not transmitted to authentication system 107 from UE 101. In some embodiments, authentication system 107 may encrypt, hash, or otherwise alter the biometric information as received, such that raw biometric information is not stored by authentication system 107. In some embodiments, the registration process (at 202) may include providing an account name or other suitable identifier associated with UE 101, and/or with a user of UE 101.

UE location component 203, which may be an element of RAN 105 and/or an element of a core network that is communicatively coupled to RAN 105, may monitor (at 204) a location of UE 101. For example, as discussed above, UE location component 203 may monitor the location of UE 101 on an ongoing basis, and/or upon the occurrence of particular events (e.g., UE 101 powering on, UE 101 connecting to RAN 105, UE 101 entering or exiting a coverage area associated with RAN 105, and/or other events). In some embodiments, UE 101 may monitor its own location (e.g., using a GPS technique and/or some other suitable technique), and may provide location information to UE location component 203 via an API or some other suitable communication pathway.

Participant device 103 may output (at 206) an authentication request to authentication system 107. As discussed above, while shown as being sent from participant device 103 to authentication system 107, in some embodiments, the authentication request may be sent to some other device or system, such as an application server with which participant device 103 or an application associated with participant device 103 communicates. Such device or system may forward the authentication request to authentication system 107, and/or may generate the authentication request based on communications from participant device 103. In some embodiments, the authentication request may include a location associated with participant device 103. For example, participant device 103 may determine its own location using GPS techniques, wireless triangulation techniques, and/or some other suitable technique, and may include such location information in the authentication request. In some embodiments, authentication system 107 may determine a location based on traffic information, such as an IP address of participant device 103 from which the authentication request was received, may perform a traceroute to identify a routing path between authentication system 107 and participant device 103, and/or may determine or estimate the location of participant device 103 using one or more other suitable techniques.

Authentication system 107 may determine (at 208) that further authentication should be performed. For example, authentication system 107 may identify that participant device 103 has been previously registered as being associated with UE 101, based on an IP address, device identifier, or other type of identifier of participant device 103 provided or determined during the registration process (at 202). In some embodiments, the authentication request may include a user name or other account identifier, based on which authentication system 107 may determine (at 208) that participant device 103 is associated with UE 101 (e.g., that UE 101 and participant device 103 are associated with the same account or user).

Based on determining that further authentication should be performed, authentication system 107 may request (at 210) a location of UE 101. In some embodiments, authentication system 107 may request the UE location from UE location component 203. In some embodiments, authentication system 107 and/or UE location component 203 may implement an API, via which authentication system 107 may make such a request, and further via which UE location component 203 may provide the requested location information. For example, as noted above, authentication system 107 and UE location component 203 may communicate via a SCEF, a NEF, or some other suitable device, system, or network function. The location information request may include an IMSI value, IMEI value, MDN, or other suitable identifier of UE 101 (e.g., as received by authentication system 107 during the registration process (at 202)).

UE location component 203 may identify the monitored location of UE 101, and may provide (at 212) the location of UE 101 to authentication system 107. While not discussed at length here, in some embodiments, authentication system 107 may perform or participate in a registration with UE location component 203, and UE location component 203 may authenticate authentication system 107 prior to providing (at 212) the location information of UE 101 to authentication system 107.

In this example, authentication system 107 may determine (at 214) that UE 101 and UE location component 203 are within a threshold proximity. For example, based on the locations of participant device 103 and UE 101 (e.g., as received at 206 and 212), authentication system 107 may determine that UE 101 and participant device 103 are within a threshold proximity of each other. Such a determination may indicate that an individual initiating the authentication request from participant device 103 is in possession of UE 101, which may further suggest that the individual initiating such request is the user associated with UE 101.

Accordingly, authentication system 107 may accept (at 216) the authentication request. For example, authentication system 107 may indicate the acceptance to participant device 103, to a device or system in communication with participant device 103 (e.g., an application server that is in communication with participant device 103 to provide a requested service, such as a video conferencing service, a banking application, or other suitable service or resource).

Figure 3:
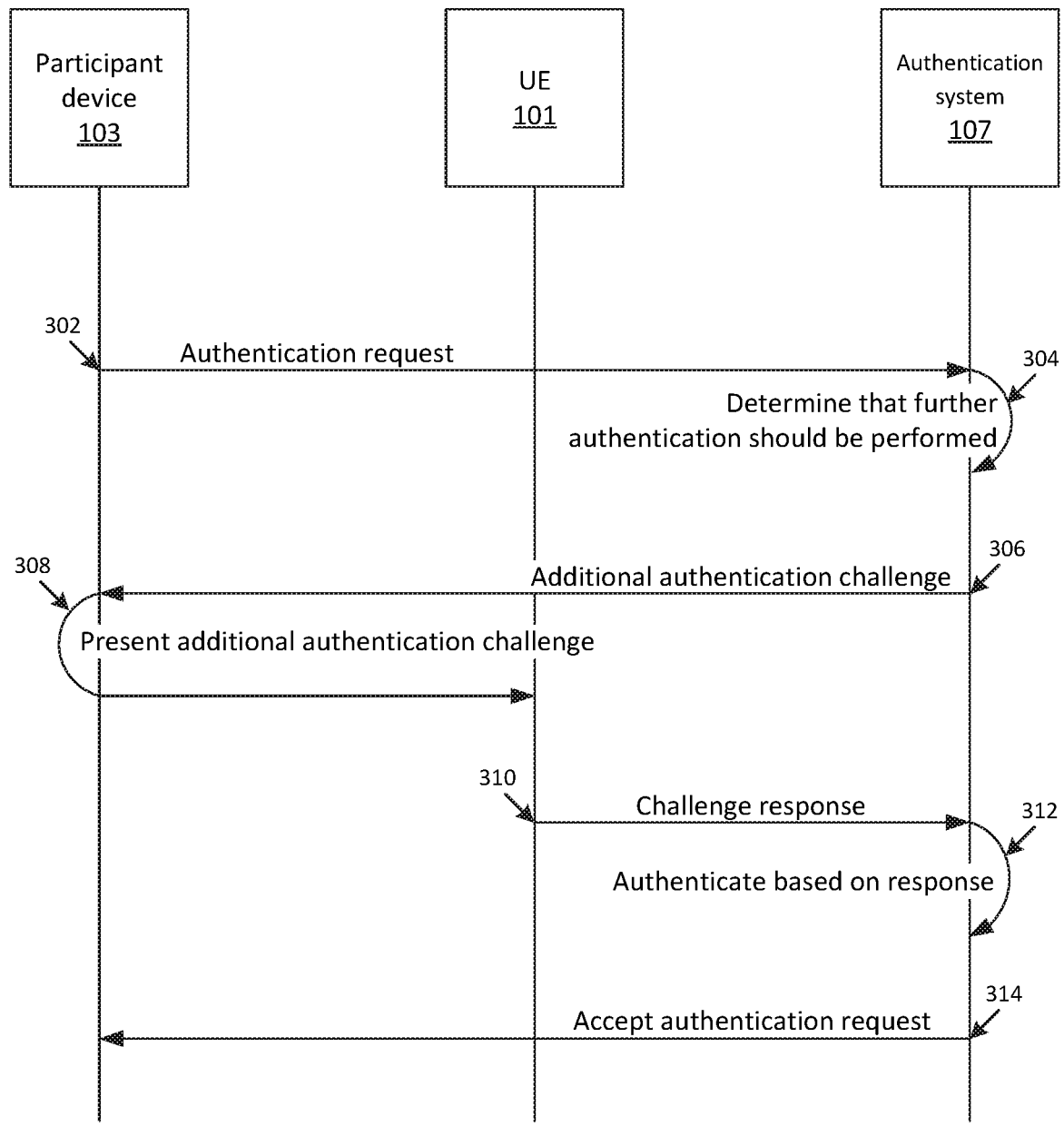
FIGS. 3 illustrates an example signal flow for authenticating a participant device based on an authentication challenge sent to an associated UE, in accordance with some embodiments.

FIG. 3 illustrates an example signal flow for authenticating participant device 103 based on an authentication challenge sent to an associated UE 101, in accordance with some embodiments. Some portions of FIG. 3 are similar to portions of FIG. 2 described above, and will not be described in detail for the sake of brevity. Further, some of the operations shown in FIG. 2, which are not shown in FIG. 3, may also occur prior to or otherwise in concert with the operations shown in FIG. 3. For example, while not shown in FIG. 3, UE 101, participant device 103, and/or authentication system 107 may participate in a pairing process, such that authentication system 107 maintains an association between UE 101 and participant device 103.

As shown, participant device 103 may output (at 302) an authentication request to authentication system 107, and authentication system 107 may determine (at 304) that further authentication should be performed. Authentication system 107 may accordingly output (at 306) an additional authentication challenge. For example, the additional authentication challenge may be an image, a Quick Response ("QR") code, a password, and/or some other type of information, which may be presented (at 308) by participant device 103. For example, participant device 103 may present the additional authentication challenge via a display screen associated with participant device 103, a speaker, and/or some other output device. UE 101 may provide (at 310) a challenge response to authentication system 107, based on the authentication challenge presented (at 308) by participant device 103.

Figure 4:
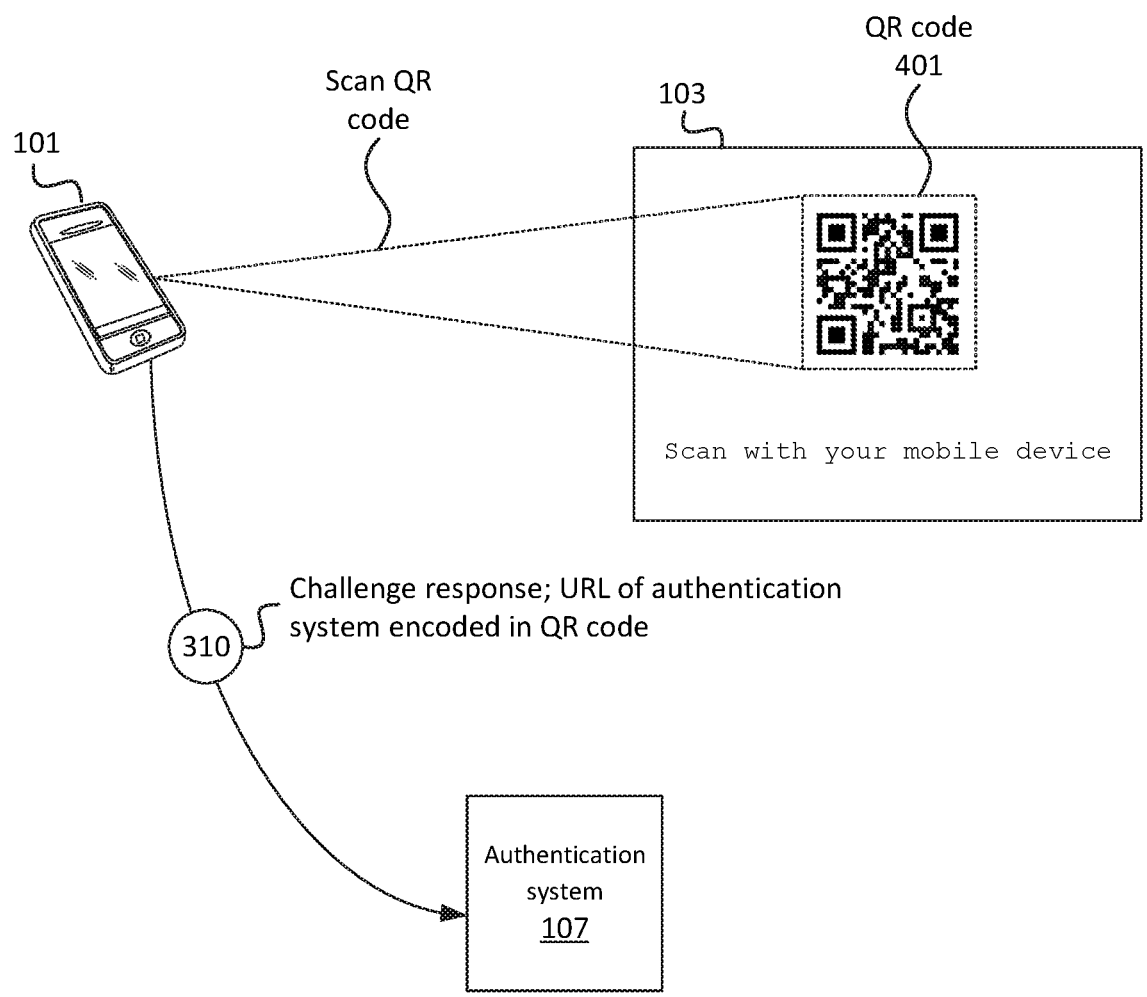
FIG. 4 illustrates an example authentication challenge that may be sent to a UE, in accordance with some embodiments.

FIG. 4 illustrates an example of such a challenge and challenge response, in accordance with some embodiments. In this example, the additional authentication challenge may include QR code 401, which may be displayed by participant device 103. In some embodiments, the additional authentication challenge may include, and/or may be presented with, an instruction for a user of participant device 103 and/or UE 101. For example, in this example, the instruction may include the phrase, "Scan with your mobile device." UE 101 may scan QR code 401 as presented by participant device 103, and may output (at 310) a challenge response based on the scanned QR code 401.

For example, in some embodiments, QR code 401 may include a URL, IP address, and/or other type of identifier via which UE 101 may communicate with authentication system 107. In some embodiments, QR code 401 may include an encoded or encrypted value, which UE 101 may decode (e.g., using a private key, which may have been established during a registration process between UE 101 and authentication system 107) and provide a decoded or decrypted value to authentication system 107. In some embodiments, UE 101 may provide, as part of the challenge response (at 310), an IMSI value, an IMEI value, a MDN, or other identifier associated with UE 101. Generally, if UE 101 is able to successfully pass the authentication challenge (e.g., by scanning QR code 401, as presented by participant device 103), this may indicate that UE 101 is within a threshold proximity of participant device 103. Returning to FIG. 3, authentication system 107 may authenticate (at 312) participant device 103 based on the received response, and may indicate (at 314) the successful authentication to participant device 103 or some other device or system, as similarly described above.

Figure 5:
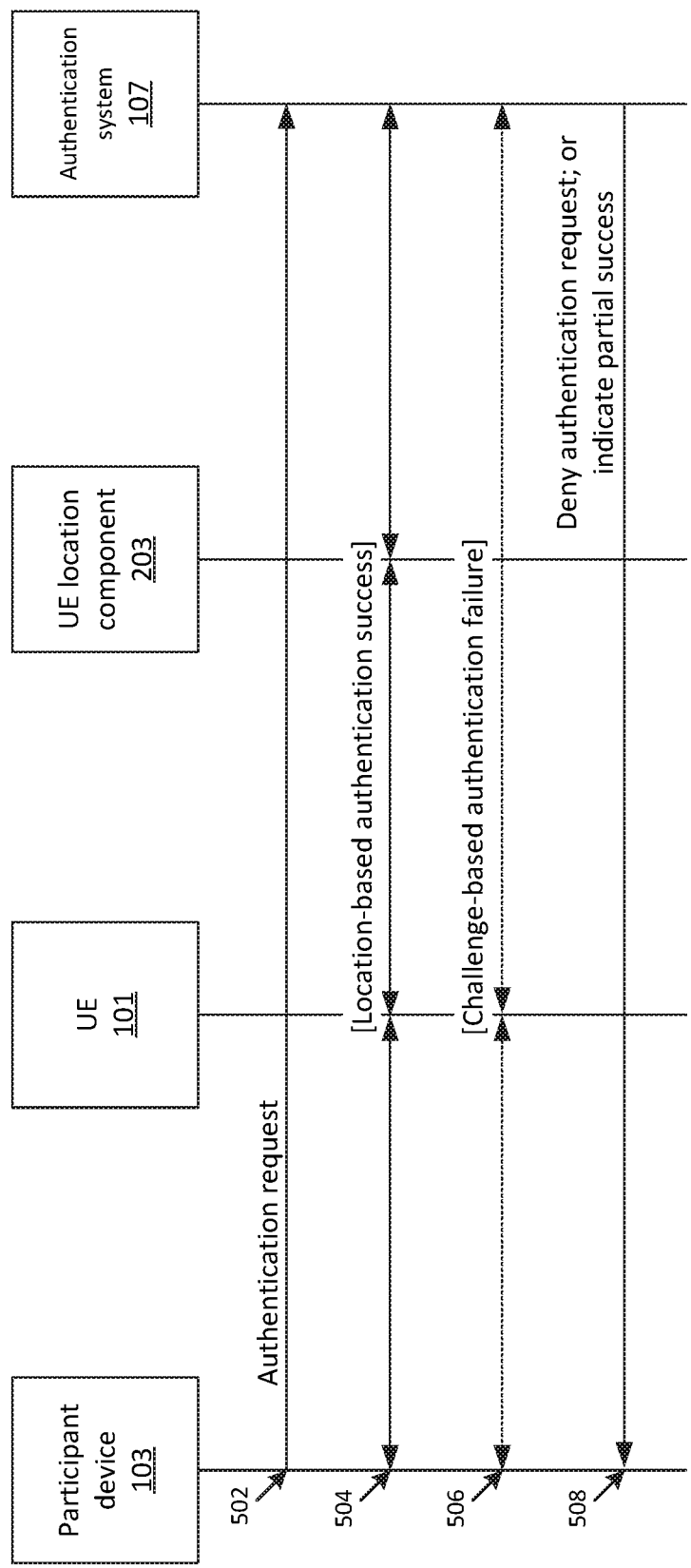
FIGS. 5 and 6 illustrate example signal flows corresponding to the denial of an authentication request of a participant device based on one or more authentication failures associated with an associated UE, in accordance with some embodiments.
Figure 6:
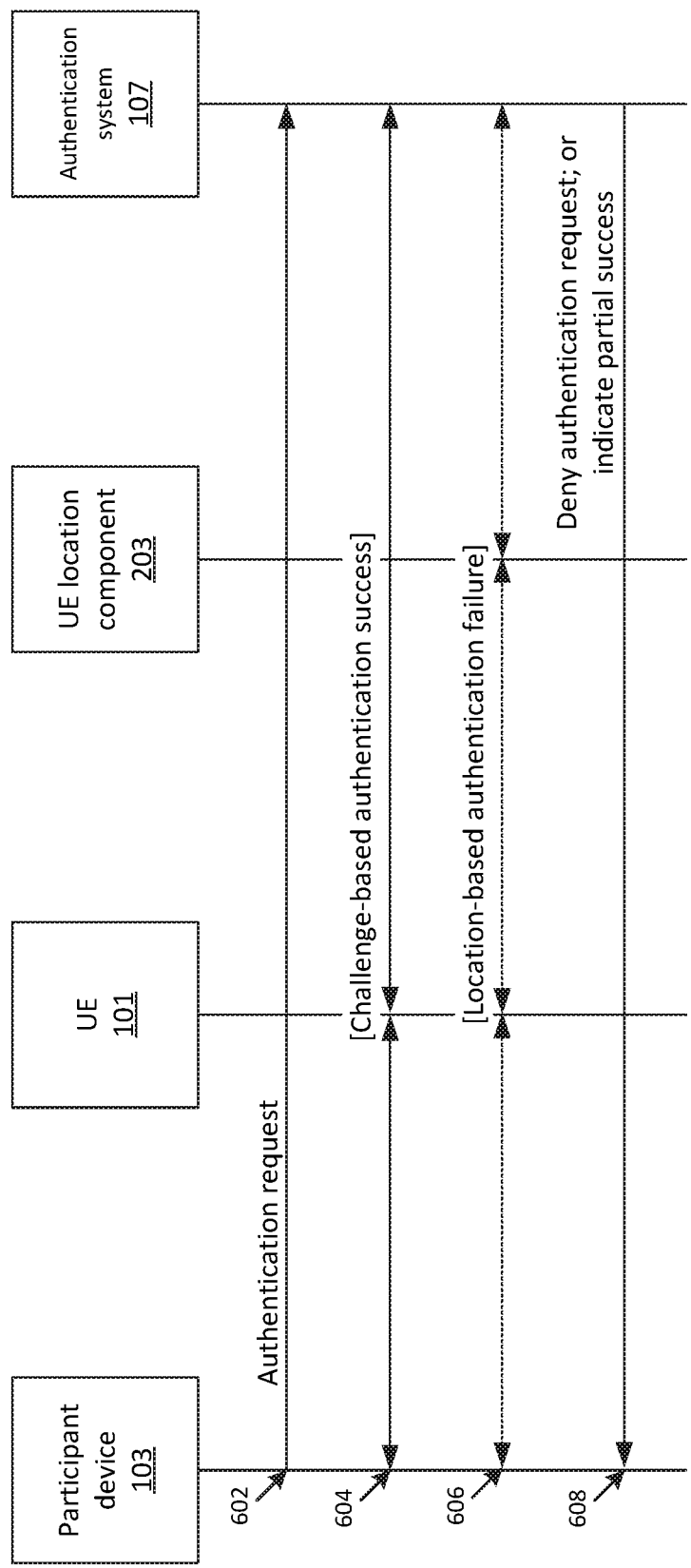

FIGS. 5 and 6 illustrate example signal flows corresponding to the denial of an authentication request of participant device 103 based on one or more authentication failures associated with associated UE 101, in accordance with some embodiments. In some embodiments, FIGS. 5 and 6 may correspond to embodiments in which a location-based authentication procedure (e.g., as described above with respect to FIG. 2) and a challenge-based authentication procedure (e.g., as described above with respect to FIG. 3) are both performed. For example, both procedures may be required or implemented by authentication system 107, an application server that provides secure services to participant device 103, etc. For example, requiring such multiple levels of authentication may provide an additional layer of security over using fewer levels of authentication.

As shown in FIG. 5, for example, participant device 103 may output (at 502) an authentication request to authentication system 107. As similarly noted above, UE 101, participant device 103, and/or authentication system 107 may have performed a registration process by which authentication system 107 maintains association information for participant device 103 and UE 101. As further shown, a location-based authentication process (at 504) may be successful. For example, as similarly discussed above with respect to FIG. 2, authentication system 107 may determine that a proximity of participant device 103 and UE 101 is within a threshold proximity, based on which the location-based authentication process (at 504) may be successful. However, the challenge-based authentication process (at 506) may not be completed successfully. For example, UE 101 may not provide an adequate, expected, or otherwise correct challenge response, and/or may not communicate with authentication system 107 within a threshold amount of time after authentication system 107 sent an additional authentication challenge to participant device 103.

Accordingly, authentication system 107 may deny (at 508) the authentication request, or may indicate a partial success. For example, authentication system 107 may indicate, to participant device 103, an application server in communication with participant device 103, or some other device or system, that the location-based authentication was successful, while the challenge-based authentication process was not successful. Participant device 103, the application server, etc. may accordingly provide limited access to a requested service (e.g., may provide less information, resources, etc. than if both forms of authentication were successful).

As similarly shown in FIG. 6, participant device 103 may output (at 602) an authentication request to authentication system 107, and a challenge-based authentication process (at 604) may be successful. As further shown, a location-based authentication process (at 606) may not be successful, which may occur, for example, in situations where a malicious user has managed to bypass the challenge-based authentication process but is not in possession of UE 101. Accordingly, authentication system 107 may deny (at 608) the authentication request, and/or may indicate a partial success, as similarly discussed above. For example, as discussed above, authentication system 107 may indicate the partial success to UE 101, participant device 103, and/or to some other device or system that is in communication with or is otherwise associated with UE 101 and/or participant device 103, such as a device or system that is associated with a service or resource associated with the authentication request.

Figure 7:
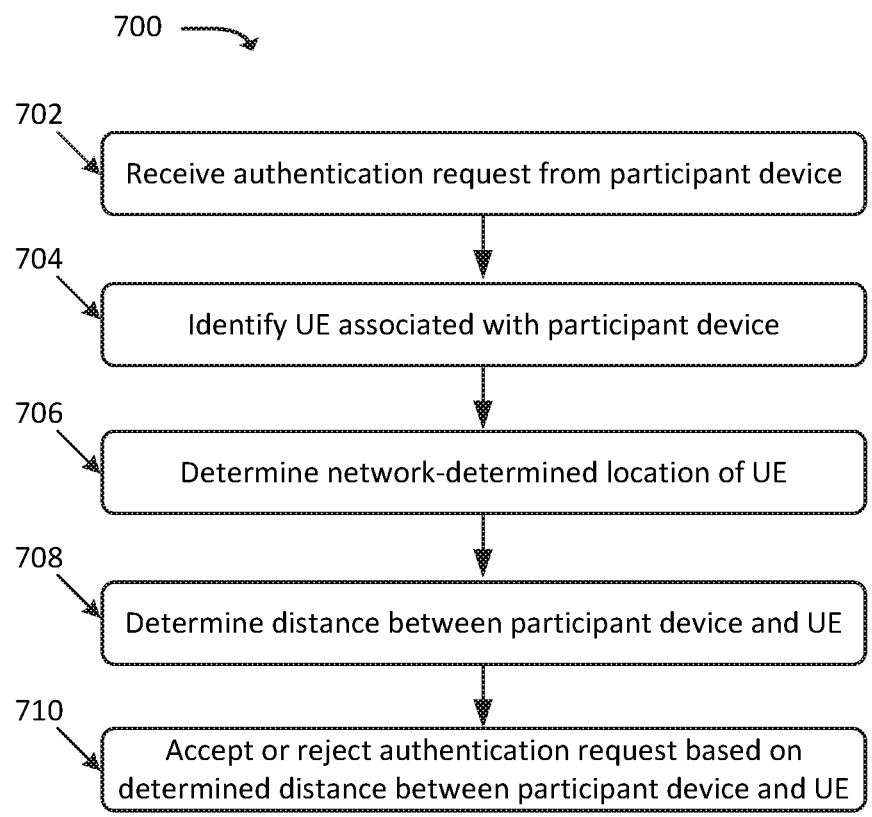
FIG. 7 illustrates an example process for authenticating a particular participant device based on proximity to an associated UE, in accordance with some embodiments.

FIG. 7 illustrates an example process 700 for authenticating a particular participant device 103 based on proximity to an associated UE 101, in accordance with some embodiments. In some embodiments, some or all of process 700 may be performed by authentication system 107. In some embodiments, one or more other devices may perform some or all of process 700 in concert with, and/or in lieu of, authentication system 107, such as a device or system that provides services or resources to participant device 103 and/or UE 101 (e.g., an application server, web server, etc.).

As shown, process 700 may include receiving (at 702) an authentication request from participant device 103. For example, as discussed above, participant device 103 may implement an API by which participant device 103 communicates with authentication system 107 in order to authenticate a request for services, resources, or the like. Additionally, or alternatively, participant device 103 may be in communication with a device or system that provides services (e.g., video conferencing services, messaging services, streaming services, gaming services, etc.) or resources (e.g., content, web-accessible resources, and/or other resources).

As discussed above, the authentication request may include a user name, account identifier, and/or some other type of identifying information. In some embodiments, the authentication request may further include location information associated with participant device 103. The location information may be provided by participant device 103. In some embodiments, the location information may be received from a device or system from which the authentication request is received (e.g., an application server or other suitable device or system).

In some embodiments, the authentication request may include a user name and password, PIN, and/or some other form of authentication mechanism, which authentication system 107 may use to perform one layer of authentication on the authentication request. In situations where this layer of authentication is not successful, authentication system 107 may reject the authentication request at least on this basis. In some embodiments, in lieu of authentication system 107 performing this layer of authentication, another device or system may authenticate the user name and password, PIN, etc. and may indicate to authentication system 107 whether this layer of authentication was successful or not.

Process 700 may further include identifying (at 704) a particular UE 101 with which participant device 103 is associated. For example, authentication system 107 may maintain or receive information that links the identifying information included in the request to a particular UE 101. As noted above, UE 101 and participant device 103 may have been associated during a previous registration process, and/or authentication system 107 may otherwise receive or maintain information that correlates UE 101 to one or more participant devices 103.

Process 700 may additionally include determining (at 706) a network-determined location of UE 101. For example, as discussed above, authentication system 107 may communicate with one or more elements of RAN 105 and/or a core network with which UE 101 is associated. For example, RAN 105 may be a RAN to which UE 101 is connected, and/or is associated with a coverage area in which UE 101 is located. Further, the core network may be a core network with which UE 101 has been registered, provisioned, etc.

Process 700 may also include determining (at 708) a distance between UE 101 and participant device 103. For example, authentication system 107 may calculate a distance between UE 101 and participant device 103, and/or a proximity of UE 101 to participant device 103, based on the respective locations of UE 101 and participant device 103 (e.g., as received at 702 and 706).

Process 700 may further include accepting or rejecting (at 710) the authentication request based on the determined distance between UE 101 and participant device 103. For example, authentication system 107 may maintain information specifying a threshold distance or proximity between UE 101 and participant device 103. In some embodiments, the authentication request may specify a level of security or may otherwise indicate the threshold distance. For example, in some embodiments, the authentication request may be received from a video conferencing application server and may be associated with a request to join a video conference. In one example, a host of the video conference may have specified that a relatively high level of security is required. In such an example, the threshold distance or proximity may be relatively low (e.g., UE 101 may need to be relatively close to participant device 103 in order to satisfy the threshold distance). In another example, the host of the video conference may not have specified the relatively high level of security, and/or may have specified a relatively lower level of security. In this example, the threshold distance or proximity may be relatively higher (e.g., UE 101 may not need to be as close to participant device 103 in order to satisfy the threshold distance).

If the determined distance between UE 101 and participant device 103 is within (e.g., less than) the threshold distance or proximity, then authentication system 107 may accept the authentication request. For example, authentication system 107 may indicate, to a device or system from which the authentication request was received (at 702) that the authentication request has been accepted. If, on the other hand, the determined distance between UE 101 and participant device 103 is not within (e.g., is greater than) the threshold distance or proximity, then authentication system 107 may deny the authentication request.

In some embodiments, if the authentication request is denied, authentication system 107 may attempt to obtain different authentication information to verify that participant device 103 is authorized to receive the requested services or resources. For example, authentication system 107 may send a challenge to participant device 103 and may authenticate the request if an appropriate challenge response is received (e.g., from UE 101), as discussed above. In some embodiments, authentication system 107 may use such additional authentication procedures in addition to verifying that UE 101 and participant device 103 are within a threshold proximity of each other.

Figure 8:
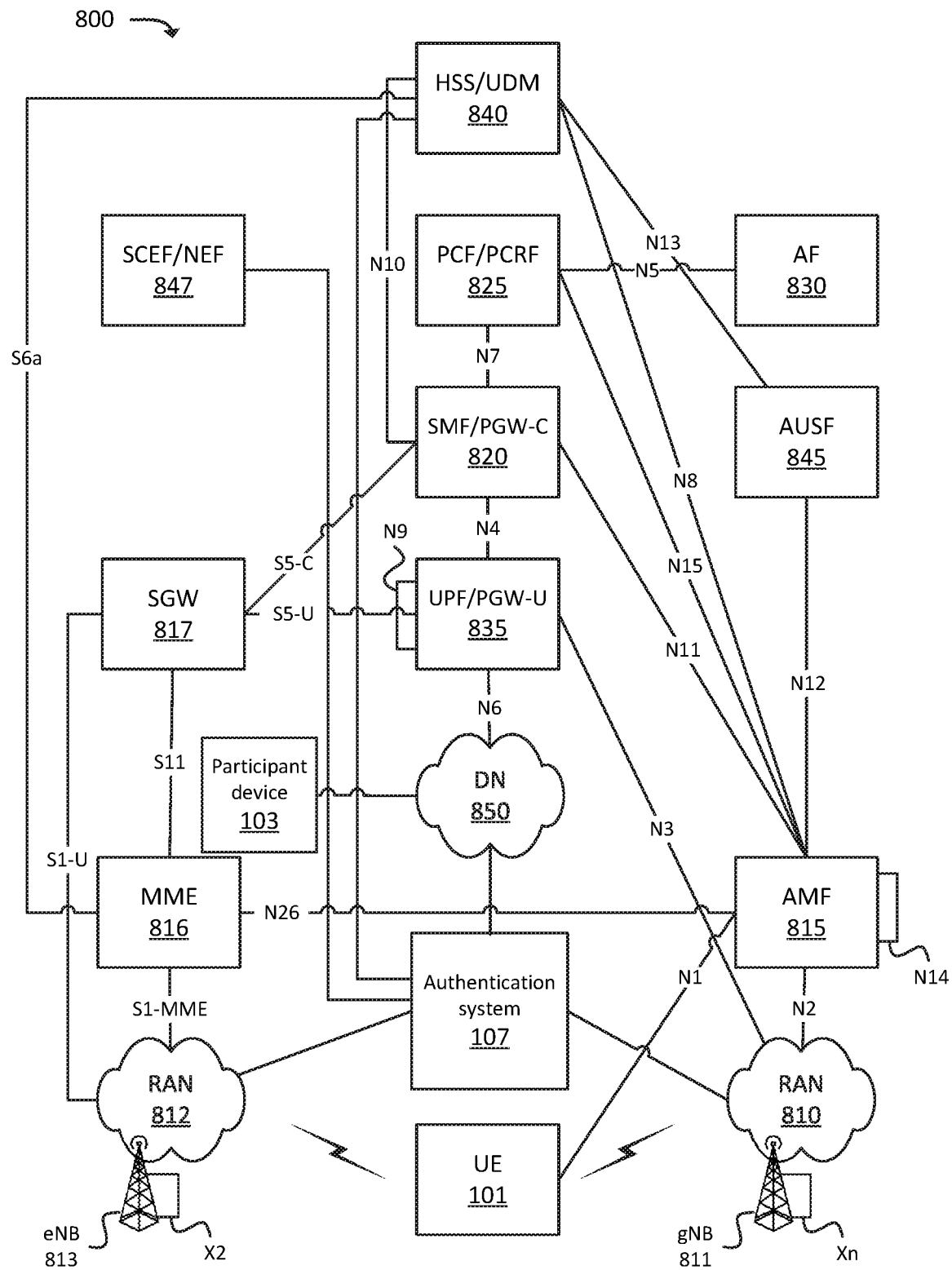
FIG. 8 illustrates an example environment in which one or more embodiments, described herein, may be implemented.

FIG. 8 illustrates an example environment 800, in which one or more embodiments may be implemented. In some embodiments, environment 800 may correspond to a 5G network, and/or may include elements of a 5G network. In some embodiments, environment 800 may correspond to a 5G Non-Standalone ("NSA") architecture, in which a 5G RAT may be used in conjunction with one or more other RATs (e.g., a Long-Term Evolution LTE RAT), and/or in which elements of a 5G core network may be implemented by, may be communicatively coupled with, and/or may include elements of another type of core network (e.g., an EPC). As shown, environment 800 may include UE 101, RAN 810 (which may include one or more Next Generation Node Bs ("gNBs") 811), RAN 812 (which may include one or more one or more evolved Node Bs ("eNBs") 813), and various network functions such as Access and Mobility Management Function ("AMF") 815, Mobility Management Entity ("MME") 816, Serving Gateway ("SGW") 817, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, Home Subscriber Server ("HSS")/Unified Data Management ("UDM") 840, Authentication Server Function ("AUSF") 845, SCEF/NEF 847, and participant device 103. Environment 800 may also include one or more networks, such as Data Network ("DN") 850.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively, or additionally, one or more of the devices of environment 800 may perform one or more network functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 101 may include a computation and communication device, such as a wireless mobile communication device that is capable of communicating with RAN 810, RAN 812, and/or DN 850. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 101 may send traffic to and/or receive traffic (e.g., user plane traffic) from DN 850 via RAN 810, RAN 812, and/or UPF/PGW-U 835.

Participant device 103 may include a computation and communication device that is capable of communicating with DN 850. Participant device 103 may be, or may include, a laptop computer, a tablet computer, a camera, a personal gaming system, an IoT device (e.g., a sensor, a smart home appliance, or the like), a wearable device, an IoT device, a M2M device, or another type of mobile computation and communication device. Participant device 103 may send traffic to and/or receive traffic from DN 850. In some embodiments, participant device 103 may, may include, may implement, or may be an instance of UE 101. In such embodiments, participant device 103 may not be connected to a particular RAN 810 or 812, but may be associated with a UE 101 that is connected to RAN 810 or 812. In some embodiments, authentication system 107, HSS/UDM 840, and/or some other device or system may maintain information associating participant device 103 with UE 101.

RAN 810 may be, or may include, a 5G RAN that includes one or more base stations (e.g., one or more gNBs 811), via which UE 101 may communicate with one or more other elements of environment 800. UE 101 may communicate with RAN 810 via an air interface (e.g., as provided by gNB 811). For instance, RAN 810 may receive traffic (e.g., voice call traffic, data traffic, messaging traffic, signaling traffic, etc.) from UE 101 via the air interface, and may communicate the traffic to UPF/PGW-U 835, and/or one or more other devices or networks. Similarly, RAN 810 may receive traffic intended for UE 101 (e.g., from UPF/PGW-U 835, AMF 815, and/or one or more other devices or networks) and may communicate the traffic to UE 101 via the air interface. In some embodiments, RAN 810 may be, may include, may implement, and/or may be an instance of RAN 105.

RAN 812 may be, or may include, a LTE RAN that includes one or more base stations (e.g., one or more eNBs 813), via which UE 101 may communicate with one or more other elements of environment 800. UE 101 may communicate with RAN 812 via an air interface (e.g., as provided by eNB 813). For instance, RAN 810 may receive traffic (e.g., voice call traffic, data traffic, messaging traffic, signaling traffic, etc.) from UE 101 via the air interface, and may communicate the traffic to UPF/PGW-U 835, and/or one or more other devices or networks. Similarly, RAN 810 may receive traffic intended for UE 101 (e.g., from UPF/PGW-U 835, SGW 817, and/or one or more other devices or networks) and may communicate the traffic to UE 101 via the air interface. In some embodiments, RAN 812 may be, may include, may implement, and/or may be an instance of RAN 105.

AMF 815 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 810 and/or gNBs 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 812 and/or eNBs 813, and/or to perform other operations.

SGW 817 may include one or more devices, systems, VNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, etc., that gather, process, store, and/or provide information in a manner described herein. SMF/PGW-C 820 may, for example, facilitate in the establishment of communication sessions on behalf of UE 101. In some embodiments, the establishment of communications sessions may be performed in accordance with one or more policies provided by PCF/PCRF 825.

PCF/PCRF 825 may include one or more devices, systems, VNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, etc., that receive, store, and/or provide information that may be used in determining parameters (e.g., quality of service parameters, charging parameters, or the like) for certain applications.

UPF/PGW-U 835 may include one or more devices, systems, VNFs, etc., that receive, store, and/or provide data (e.g., user plane data). For example, UPF/PGW-U 835 may receive user plane data (e.g., voice call traffic, data traffic, etc.), destined for UE 101, from DN 850, and may forward the user plane data toward UE 101 (e.g., via RAN 810, SMF/PGW-C 820, and/or one or more other devices). In some embodiments, multiple UPFs 835 may be deployed (e.g., in different geographical locations), and the delivery of content to UE 101 may be coordinated via the N9 interface (e.g., as denoted in FIG. 8 by the line marked "N9" originating and terminating at UPF/PGW-U 835). Similarly, UPF/PGW-U 835 may receive traffic from UE 101 (e.g., via RAN 810, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

HSS/UDM 840 and AUSF 845 may include one or more devices, systems, VNFs, etc., that manage, update, and/or store, in one or more memory devices associated with AUSF 845 and/or HSS/UDM 840, profile information associated with a subscriber. AUSF 845 and/or HSS/UDM 840 may perform authentication, authorization, and/or accounting operations associated with the subscriber and/or a communication session with UE 101.

SCEF/NEF 847 may include one or more devices, systems, VNFs, etc. that provide network-related information to devices or systems that are external to the core network(s) shown in FIG. 8. For example, SCEF/NEF 847 may implement an API via which SCEF/NEF 847 may receive requests for information, instructions to configure or modify elements of the core network, and/or perform other functions. For example, SCEF/NEF 847 may provide user or subscriber information (e.g., as stored by HSS/UDM 840 or some other element of the core network) to authentication system 107 and/or to some other device or system. Although no lines are shown in the figure between SCEF/NEF 847 and other elements of the core network (e.g., AMF 815, MME 816, and/or other elements) for the sake of clarity, in practice, SCEF/NEF 847 may communicate with some or all of such elements in order to receive information and/or provide instructions or other information to such elements.

Authentication system 107 may include one or more devices, systems, VNFs, etc. that perform one or more operations described above. For example, authentication system 107 may communicate with SCEF/NEF 847 or some other device or system to determine one or more UEs 101 that are associated with one or more respective participant devices 103, and may respond to authentication requests from participant device 103 in accordance with embodiments described above.

DN 850 may include one or more wired and/or wireless networks. For example, DN 850 may include an Internet Protocol IP-based PDN, a wide area network ("WAN") such as the Internet, a private enterprise network, and/or one or more other networks. UE 101 may communicate, through DN 850, with data servers, other UEs 101, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 101 may communicate.

Figure 9:
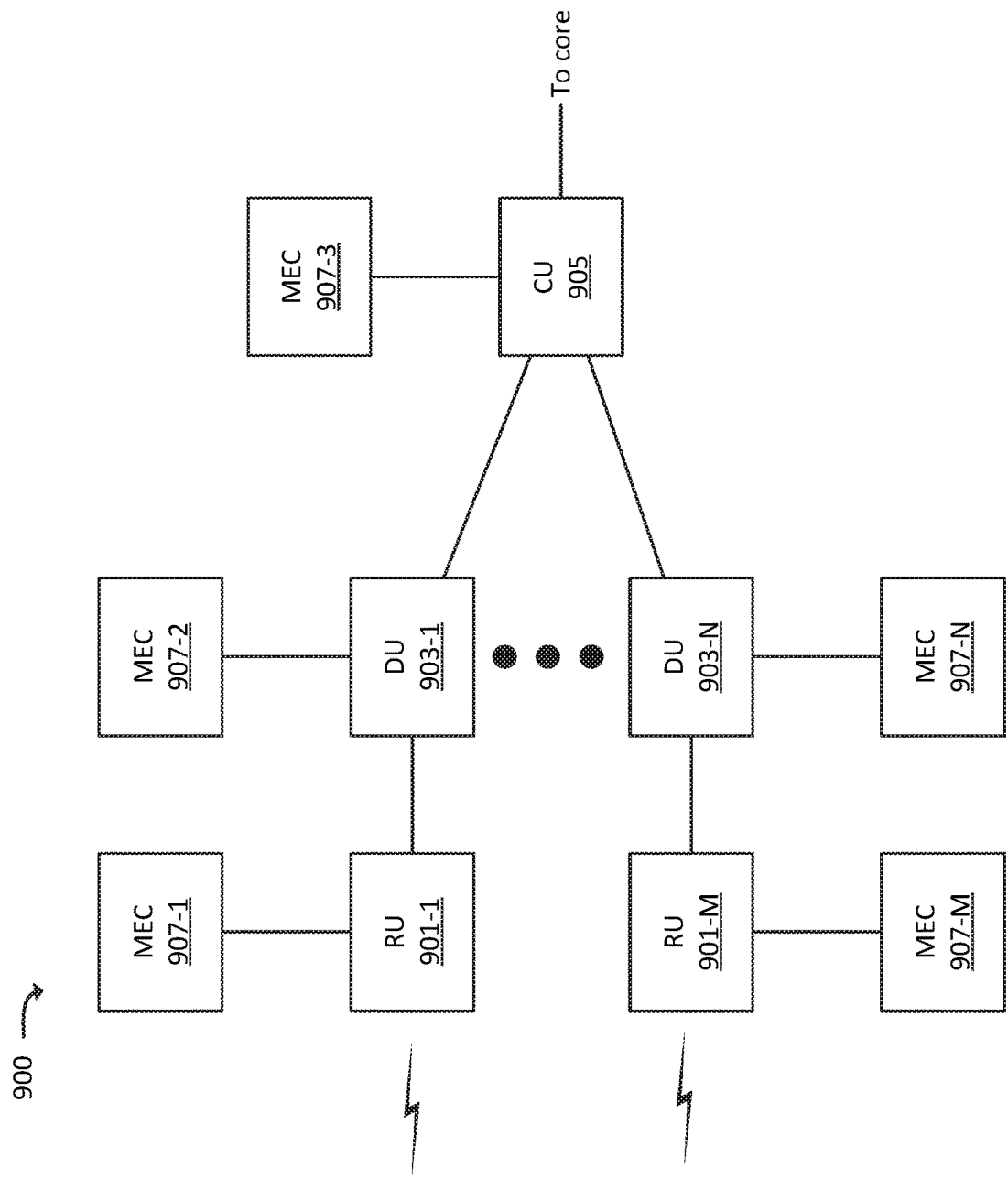
FIG. 9 illustrates an example arrangement of a radio access network ("RAN"), in accordance with some embodiments.

FIG. 9 illustrates an example Distributed Unit ("DU") network 900, which may be included in and/or implemented by one or more RANs (e.g., RAN 810). In some embodiments, a particular RAN may include one DU network 900. In some embodiments, a particular RAN may include multiple DU networks 900. In some embodiments, DU network 900 may correspond to a particular gNB 811 of a 5G RAN (e.g., RAN 810). In some embodiments, DU network 900 may correspond to multiple gNBs 811. In some embodiments, DU network 900 may correspond to one or more other types of base stations of one or more other types of RANs. As shown, DU network 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 815 and/or UPF/PGW-U 835). In the uplink direction (e.g., for traffic from UEs 101 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 101, and may determine which DU(s) 903 should receive the downlink traffic. DU 903 may include one or more devices that transmit traffic between a core network (e.g., via CU 905) and UE 101 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 101.

RU 901 may include hardware circuitry (e.g., one or more RF transceivers, antennas, radios, and/or other suitable hardware) to communicate wirelessly (e.g., via an RF interface) with one or more UEs 101, one or more other DUs 903 (e.g., via RUs 901 associated with DUs 903), and/or any other suitable type of device. In the uplink direction, RU 901 may receive traffic from UE 101 and/or another DU 903 via the RF interface and may provide the traffic to DU 903. In the downlink direction, RU 901 may receive traffic from DU 903, and may provide the traffic to UE 101 and/or another DU 903.

RUs 901 may, in some embodiments, be communicatively coupled to one or more Multi-Access/Mobile Edge Computing ("MEC") devices, referred to sometimes herein simply as ("MECs") 907. For example, RU 901-1 may be communicatively coupled to MEC 907-1, RU 901-M may be communicatively coupled to MEC 907-M, DU 903-1 may be communicatively coupled to MEC 907-2, DU 903-N may be communicatively coupled to MEC 907-N, CU 905 may be communicatively coupled to MEC 907-3, and so on. MECs 907 may include hardware resources (e.g., configurable or provisionable hardware resources) that may be configured to provide services and/or otherwise process traffic to and/or from UE 101, via a respective RU 901.

For example, RU 901-1 may route some traffic, from UE 101, to MEC 907-1 instead of to a core network (e.g., via DU 903 and CU 905). MEC 907-1 may process the traffic, perform one or more computations based on the received traffic, and may provide traffic to UE 101 via RU 901-1. In this manner, ultra-low latency services may be provided to UE 101, as traffic does not need to traverse DU 903, CU 905, and an intervening backhaul network between DU network 900 and the core network. In some embodiments, MEC 907 may include, and/or may implement some or all of the functionality described above with respect to authentication system 107.

Figure 10:
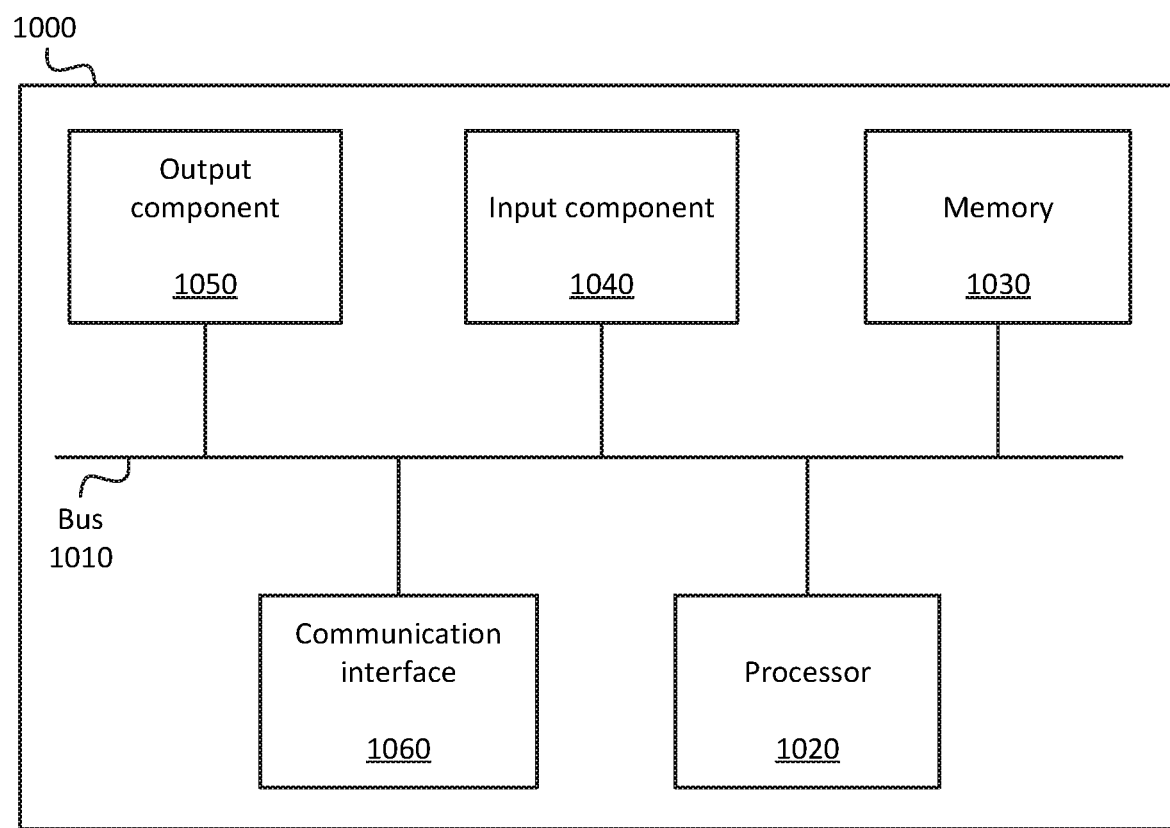
FIG. 10 illustrates example functional components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device

1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
register a first device and a second device with a same particular identifier;
receive an authentication request to authenticate the first device, the authentication request including the particular identifier and further indicating a first location associated with the first device;
identify, based on the particular identifier, that the authentication request is further associated with the second device, the second device further being associated with a wireless network that monitors a location of the second device;

receive, from the wireless network and based on identifying that the authentication request is associated with the second device, a second location associated with the second device;

determine a distance between the first device and the second device by comparing the first location and the second location;

compare the determined distance to a threshold distance;

determine whether to accept or deny the authentication request based on comparing the determined distance between the first and second devices that have been registered with the same particular identifier to the threshold distance, wherein determining whether to accept or deny the authentication request includes:

determining that the authentication request should be denied when the determined distance exceeds the threshold distance, and determining that the authentication request should be granted when the determined distance does not exceed the threshold distance;

accept the received authentication request when determining that the authentication request should be accepted; and deny the received authentication request when determining that the authentication request should be denied.

2. The device of claim 1, wherein the authentication request is received from a third device that provides one or more services or resources to the first device when the authentication request is accepted, wherein accepting the authentication request includes outputting an indication to the third device that the authentication request was accepted.

3. The device of claim 1, wherein the wireless network includes at least one of:
a Long-Term Evolution ("LTE") network, or
a Fifth Generation ("5G") network.

4. The device of claim 1, wherein receiving the second location from the wireless network includes receiving the second location from at least one of:
a Service Capability Exposure Function ("SCEF") associated with the wireless network, or
a Network Exposure Function ("NEF") associated with the wireless network.

5. The device of claim 1, wherein the second location, associated with the second device, includes a Tracking Area ("TA") associated with one or more radio access network ("RANs") of the wireless network.

6. The device of claim 1, wherein the second device includes a User Equipment ("UE") that is connected to a radio access network ("RAN") associated with the wireless network.

7. The device of claim 1, wherein determining whether to accept or deny the authentication request to authenticate the first device further includes:
outputting an authentication challenge to the second device; and
determining whether a response to the authentication challenge was received from the first device.

8. A non-transitory computer-readable medium, storing a plurality of processor-executable instructions to:
register a first device and a second device with a same particular identifier;
receive an authentication request to authenticate the first device, the authentication request including the particular identifier and further indicating a first location associated with the first device;

identify, based on the particular identifier, that the authentication request is further associated with the second device, the second device further being associated with a wireless network that monitors a location of the second device;

receive, from the wireless network and based on identifying that the authentication request is associated with the second device, a second location associated with the second device;

determine a distance between the first device and the second device by comparing the first location and the second location;

compare the determined distance to a threshold distance;

determine whether to accept or deny the authentication request based on comparing the determined distance between the first and second devices that have been registered with the same particular identifier to the threshold distance, wherein determining whether to accept or deny the authentication request includes:

determining that the authentication request should be denied when the determined distance exceeds the threshold distance, and determining that the authentication request should be granted when the determined distance does not exceed the threshold distance;

accept the received authentication request when determining that the authentication request should be accepted; and deny the received authentication request when determining that the authentication request should be denied.

9. The non-transitory computer-readable medium of claim 8, wherein the authentication request is received from a third device that provides one or more services or resources to the first device when the authentication request is accepted, wherein accepting the authentication request includes outputting an indication to the third device that the authentication request was accepted.

10. The non-transitory computer-readable medium of claim 8, wherein the wireless network includes at least one of:
a Long-Term Evolution ("LTE") network, or
a Fifth Generation ("5G") network.

11. The non-transitory computer-readable medium of claim 8, wherein receiving the second location from the wireless network includes receiving the second location from at least one of:
a Service Capability Exposure Function ("SCEF") associated with the wireless network, or
a Network Exposure Function ("NEF") associated with the wireless network.

12. The non-transitory computer-readable medium of claim 8, wherein the second location, associated with the second device, includes a Tracking Area ("TA") associated with one or more radio access network ("RANs") of the wireless network.

13. The non-transitory computer-readable medium of claim 8, wherein the second device includes a User Equipment ("UE") that is connected to a radio access network ("RAN") associated with the wireless network.

14. The non-transitory computer-readable medium of claim 8, wherein determining whether to accept or deny the authentication request to authenticate the first device further includes:
outputting an authentication challenge to the second device; and
determining whether a response to the authentication challenge was received from the first device.

15. A method, comprising:
registering a first device and a second device with a same particular identifier;
receiving an authentication request to authenticate the first device, the authentication request including the particular identifier and further indicating a first location associated with the first device;
identifying, based on the particular identifier, that the authentication request is further associated with the second device, the second device further being associated with a wireless network that monitors a location of the second device;
receiving, from the wireless network and based on identifying that the authentication request is associated with the second device, a second location associated with the second device;
determining a distance between the first device and the second device by comparing the first location and the second location;
comparing the determined distance to a threshold distance;
determining whether to accept or deny the authentication request based on comparing the determined distance between the first and second devices that have been registered with the same particular identifier to the threshold distance, wherein determining whether to accept or deny the authentication request includes:
determining that the authentication request should be denied when the determined distance exceeds the threshold distance, and
determining that the authentication request should be granted when the determined distance does not exceed the threshold distance;
accepting the received authentication request when determining that the authentication request should be accepted; and
denying the received authentication request when determining that the authentication request should be denied.

16. The method of claim 15, wherein the authentication request is received from a third device that provides one or more services or resources to the first device when the authentication request is accepted, wherein accepting the authentication request includes outputting an indication to the third device that the authentication request was accepted.

17. The method of claim 15, wherein the wireless network includes at least one of:
a Long-Term Evolution ("LTE") network, or
a Fifth Generation ("5G") network.

18. The method of claim 15, wherein receiving the second location from the wireless network includes receiving the second location from at least one of:
a Service Capability Exposure Function ("SCEF") associated with the wireless network, or
a Network Exposure Function ("NEF") associated with the wireless network.

19. The method of claim 15, wherein the second location, associated with the second device, includes a Tracking Area ("TA") associated with one or more radio access network ("RANs") of the wireless network.

20. The method of claim 15, wherein determining whether to accept or deny the authentication request to authenticate the first device further includes:
outputting an authentication challenge to the second device; and
determining whether a response to the authentication challenge was received from the first device.

* * * * *